United States Patent [19]

Jan

[11] Patent Number: 4,916,291
[45] Date of Patent: Apr. 10, 1990

[54] ELECTRIC DRYING APPARATUS AUTOMATIC CONTROLLER

[76] Inventor: Yih-Ching Jan, 2Fl., No. 1, Alley 2, Lane 258, Fu Hsing Rd., Luchou Hsiang, Taipei Hsien, Taiwan

[21] Appl. No.: 308,079
[22] Filed: Feb. 9, 1989
[51] Int. Cl.$^4$ .............................................. H05B 1/02
[52] U.S. Cl. .................................... 219/492; 219/497; 219/494; 236/46 F; 236/44 C; 34/53; 34/46
[58] Field of Search ................. 219/492, 494, 507–509, 219/493, 501; 34/43, 46, 53; 236/46 F, 44 C, 46 R

[56] References Cited

U.S. PATENT DOCUMENTS

| | | | |
|---|---|---|---|
| 4,132,008 | 1/1979 | Deschaaf | 34/45 |
| 4,379,964 | 4/1983 | Kanazawa et al. | 219/492 |
| 4,717,811 | 1/1988 | Fujii | 219/497 |

Primary Examiner—M. H. Paschall
Attorney, Agent, or Firm—Varndell Legal Group

[57] ABSTRACT

This invention relates to an electric drying apparatus automatic controller which automatically controls an electric drying apparatus in order to dry the articles put therein within a shortest period of time and with minimized power consumption. The control includes a timer, a humidity controller, and an exhaust control valve, wherein the timer is connected between the switch and the heater of an electric drying apparatus with the humidity controller and the exhaust control valve connected thereto. This controller is characterized in that the timer is preset for a certain period of heating time, to turn on the heater for heating, and starts counting time when the drying apparatus is turned on. While the timer is counting, the humidity controller can stop the timer's counting or reset the timer according to the relative humidity detected within the drying apparatus.

Also, the humidity controller opens or closes the exhaust control valve based upon the humidity within the frying apparatus. When the humidity withtin the drying apparatus reaches an amount below a fixed point (value), the humidity controller permits the timer to continue counting so as to turb the heater off after the selected time period has been exhausted. This arrangement accurately controls the amount of dryness of clothes within the drying apparatus with a minimum amount of power use.

3 Claims, 2 Drawing Sheets

ELECTRIC DRYING APPARATUS AUTOMATIC CONTROLLER

BACKGROUND OF THE INVENTION

A conventional electric drying apparatus (such as clothes drying machine or bowl drying machine) normally uses a timer to control the drying time. Normally, the drying time is fixedly set by the user according to his judgment so that the drying apparatus will stop the drying operation when the set time has expired. This kind of drying apparatus is not capable of determining whether the articles to be dried are sufficiently dried, when the pre-set drying time is reached. Therefore, conventional electric drying apparatus have the following drawbacks:

(1) Automatical control of drying is impossible. If the drying time is set at a range which is excessive long, one shall have to frequently open the drying apparatus to check if the articles have been sufficiently dried. If the drying time is set at a range which is excessive short, after the drying apparatus is stopped the articles to be dried may not yet be sufficiently dried, and the user will have to turn on the machine and reset the drying time again. Therefore, high efficiency becomes impossible.

(2) When drying a small volume of articles (especially clothes), the drying degree of the articles is unequal. Due to the fact that the drying time cannot be shortened in proportion to the small volume of articles, the conventional apparatus will use more energy.

Further, when using a clothes drying machine to dry a large volume of clothes, the clothes may block the exhaust hole during the revolving of the cylinder, such that the hot air stream (shown by arrows in FIGS. 1–3) is scattering inside the revolving cylinder (as shown in FIG. 3), because it has no where to go. At this moment, the utilization percentage of the heat energy reached its maximum. Because the evaporated moisture is increasing, a wider exhaust hole is required to permit the humid air to be completely exhausted from the drying machine. When drying a small volume of clothes, the exhaust hole is smoothly opened and will not be blocked by the clothes. At this moment, the clothes may stick to the inner surface of the revolving cylinder so as to rotate with the revolving cylinder when clothes rotate with the revolving cylinder, the clothes can rotate as much as 180° (right upper position) and then drop from the right upper position and "intersect" with the hot air stream. At this moment, the effective utilization of heat energy reaches to a minimum. This is because the evaporated moisture is relatively reduced and even though the exhaust hole is smoothly opened, the hot air stream does not fully fill the revolving cylinder (as shown in FIGS. 1 and 2). An effective drying process is achieved only when the clothes and the hot air stream intersect. Therefore, the drying time cannot be shortened or even must be extended when drying a small volume of clothes at one time. Because less moisture is evaporated and mixed with the hot air stream which is expelled from the drying machine, the expelled or exhausted air contains a relatively low percentage of humidity. In other words, although the detected relative humidity is low, the clothes are still wet.

The main object of the present invention is to provide an electric drying apparatus automatic controller to control the performance of the electric drying apparatus to fully utilize the heat energy provided, so as to dry equally any volume of articles put therein within a shortest period of time and in a power resource saving manner.

Other objects and features of the present invention will be fully understood from the following detailed description in connection with the annexed drawings as hereunder.

DETAILED DESCRIPTION OF THE PREFERRED EMBODIMENT

Figure 1:
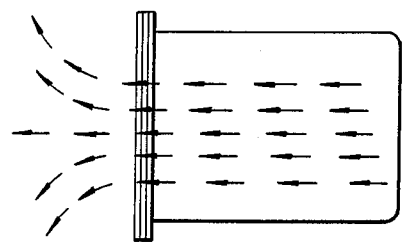
FIG. 1 is a schematic drawing, illustrating the air stream exhausting route in an electric drying apparatus of the prior art of which the exhaust hole is arranged at the right front side.
Figure 2:
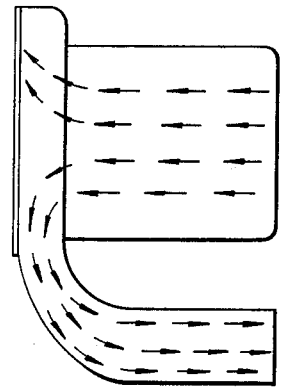
FIG. 2 is a schematic drawing, illustrating the air stream exhausting route in an electric drying apparatus of the prior art of which the exhaust hole is arranged at the bottom side.
Figure 3:
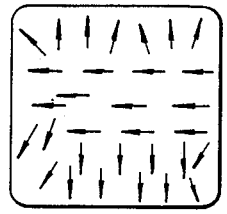
FIG. 3 is a schematic drawing of an electric drying apparatus of the prior art, illustrating the evaporated humidity is scattering therein.
Figure 4:
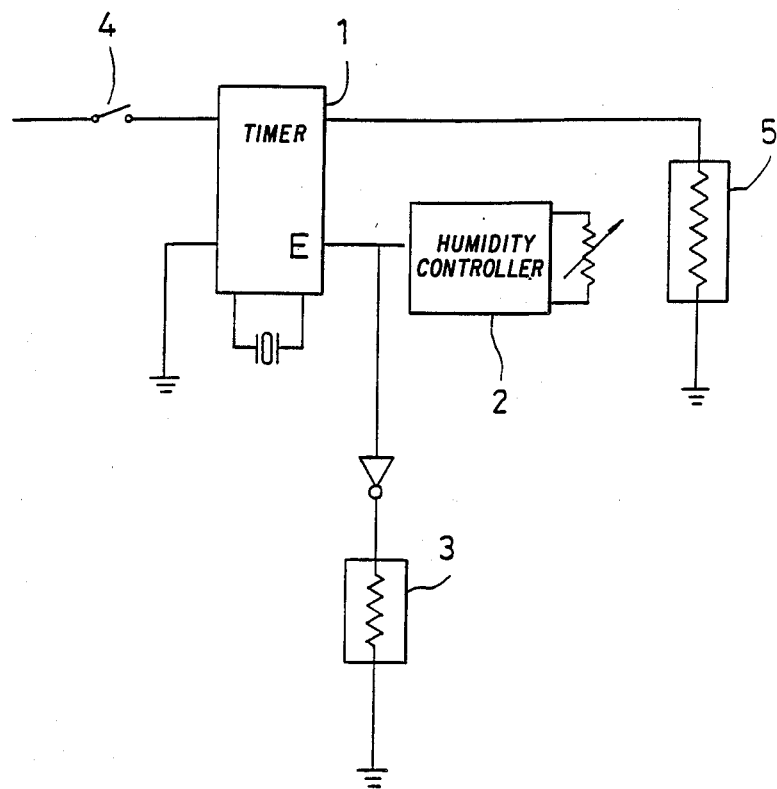
FIG. 4 is a control circuit diagram of the present invention.

Referring to FIG. 4, an electric drying apparatus automatic controller is comprised of a timer 1, a humidity controller 2, and an exhaust control valve 3. The timer 1 is interposed between the electric heater 5 and the switch 4 of an electric drying apparatus. The humidity controller 2 and the exhaust control valve 3 are respectively connected to the timer 1. The timer 1 may either be a mechanical or an electronic timer, which is preset by the user for a certain period of heating time and is used to control the heating process. The timer operates in a manner which permits moisture within the revolving cylinder of the electric drying apparatus to be evaporated from a humidity mass so that the moisture content (humidity) in the exhausted air can be accurately measured. The humidity controller 2 may be either of mechanical or electronic type and is used to control the timer and the exhaust control valve based on the measured humidity. The exhaust control valve 3 can be controlled for efficiently drying a small volume of articles (for example, clothes) by reducing the rate of exhausting hot air from the drying apparatus based on the volume of the articles to be dried. In other words, when a small volume of articles is dried, the amount of hot air stream exhausted can be relatively reduced. This permits the concentration of moisture of hot air in the revolving cylinder of the electric drying apparatus to be increased to an optimum level before it is exhausted. Because the opening of the exhaust hole of the exhaust control valve can be reduced or closed, the exhaust hole can be blocked, in a manner similar to that of a big volume of clothes blocking the exhaust hole during drying process, was discussed above. Thus, the hot air stream is forced to scatter in the revolving cylinder of the electric drying apparatus and will not be fully exhausted immediately. This permits the percentage of utilization of heat energy to increase, and the clothes in the revolving cylinder, even if they stick on the wall surface of the revolving cylinder, can be dried equally within a short period of time, the overall result is a higher efficiency performance where waste of energy can be minimized. According to various experimentations made by the present inventor, when drying a small volume of clothes with the device of the present invention, the drying time can be shortened up to one-fold in comparison with the prior art.

With respect to the operation of the present invention, please refer to FIG. 4 again. When switch 4 is turned on, the timer 1 starts to work (to count), the power output becomes ON (H) to turn on the electric heater 5 for heating. As previously described, the timer 1 is preset for a certain period of heating time. As soon as the heating time is exhausted (terminated), the power is automatically cut off by the timer, and the power output becomes OFF (L) so as to turn off the electric heater 5 to stop heating. If during the heating period, the humidity is not increased (no moisture in the hot air within the revolving cylinder of the electric drying apparatus), the power output of the humidity controller 2 remains OFF (L), and thus the exhaust control valve 3 is closed immediately. If the humidity is increased over a fixed point (value) during the heating period, the power output of the humidity controller 2 becomes ON (H), so as to stop the timer 1 thereby discontinued the counting process of the timer 1, so that the electric heater 5 continues heating, and the exhaust control valve 3 is opened for exhaustion of humid hot air. As soon as fixed point (value) of dryness is achieved, the humidity controller 2 restarts the timer 1 so as to cut off the power supply to the electric heater 5 when the reset heating time has expired, which causes the electric heater 5 to stop heating. Therefore, an accurate degree (value) of dryness can be achieved.

I claim:

1. An electric drying apparatus automatic controller for controlling an electric drying apparatus comprising:
   a humidity controller means for providing a high signal when relative humidity within a revolving cylinder of said drying apparatus is above a fixed value and a low signal when said relative humidity is below said fixed value;
   a timer means connected to a heater of said drying apparatus and to said humidity controller means for receiving said high and low signals and providing on and off signals for respectively turning said heater on and off, said, timer means being preset for a period of heating time; and said timer means starting and continuing counting of said period of heating time and providing said on signal to said heater when a power switch of said drying apparatus is turned on as long as said low signal is received, and providing said on signal to said heater and discontinuing said counting when said high signal is received; after said counting has been discontinued, said timer means resetting and restarting said counting when said low signal is received, and said timer means providing said off signal to said heater after counted time equals said period of heating time; and
   an exhaust control valve means connected to said humidity controller means and receving said high and low signals therefrom for exhausting air from within said revolving cylinder when said high signal is received, and containing said air within said revolving cylinder when said low signal is received.

2. An electric drying apparatus automatic controller according to claim 1, wherein said humidity controller means includes a humidity display.

3. An electric drying apparatus automatic controller according to claim 1, wherein said humidity controller means, said timer means and said exhaust control valve means are provided in a consolidated unit for reducing manufacturing cost and facilitating assembly of said drying apparatus.

* * * * *